United States Patent
Cincibus

[11] Patent Number: 6,032,404
[45] Date of Patent: Mar. 7, 2000

[54] PORTABLE BAIT BUCKET

[76] Inventor: Anton Frank Cincibus, 1522 Brian Rd., Baltimore, Md. 21237

[21] Appl. No.: 09/170,722

[22] Filed: Oct. 14, 1998

[51] Int. Cl.[7] .................................................. A01K 97/05
[52] U.S. Cl. .............................. 43/55; 43/56; 206/315.11
[58] Field of Search ................................ 43/54.1, 55, 56, 43/57; 206/315.11

[56] References Cited

U.S. PATENT DOCUMENTS

| | | |
|---|---|---|
| 2,082,754 | 6/1937 | Peterson . |
| 2,642,836 | 6/1953 | Brooks . |
| 2,726,039 | 4/1955 | Borrelli ........................................ 43/56 |
| 2,857,705 | 10/1958 | Woodcock . |
| 3,048,937 | 8/1962 | Hustad . |
| 3,380,186 | 4/1968 | Donner . |
| 3,834,062 | 9/1974 | Nalepka ........................................ 43/56 |
| 4,000,577 | 1/1977 | Kelley . |
| 5,138,975 | 8/1992 | Walsh . |
| 5,228,231 | 7/1993 | Larson . |
| 5,549,227 | 8/1996 | Klotz ........................................ 43/54.1 |

*Primary Examiner*—Jack W. Lavinder
*Attorney, Agent, or Firm*—H. Jay Spiegel

[57] ABSTRACT

A portable bait bucket includes a built-in handle allowing it to be easily carried from place to place. The inventive bucket includes an internal chamber accessible by an opening in its top closed by a pivotable door having a plurality of openings allowing air to enter the chamber to maintain some level of oxygenation for the water contained therein. On a forward face of the bucket, an opening is provided that may be closed with a plug to allow the user to extract bait from the inner chamber of the bucket. The inner chamber is divided into two sub-chambers by a divider that includes a water pervious wall allowing water to flow from one sub-chamber to the other. One sub-chamber is connected to the top opening and the forward facing opening. This first sub-chamber contains the bait. The second sub-chamber is not connected with the forward facing opening or the top opening. In operation, when it is desired to remove bait from the bait bucket, the plug is removed from the forward facing opening and the bait bucket is tipped forward at an angle so that water is removed from the first sub-chamber and enters the second sub-chamber via the water pervious wall of the divider. When this occurs, the live bait flows over the top of the divider which extends to just below the forward facing opening, whereupon bait begins to exit the forward facing opening into the waiting hand of the user. As this process is continuing, water fills the second sub-chamber and is trapped within the second sub-chamber by the water pervious wall.

19 Claims, 5 Drawing Sheets

PORTABLE BAIT BUCKET

BACKGROUND OF THE INVENTION

The present invention relates to a portable bait bucket. In the prior art, bait buckets are known. However, Applicant is unaware of any such device that allows the user to easily access live bait contained in water merely by tipping the bucket at an appropriate angle to allow the bait to exit the bucket through a controlled opening while the water remains inside.

The following prior art is known to Applicant:

U.S. Pat. No. 2,857,705 to Woodcock discloses a bait dispenser including a transparent jar having a generally conical cover for the opening thereof. Woodcock contemplates the dispensing of bait such as roaches and crickets. Thus, when the Woodcock container is tipped to cause the bait to exit an opening in the conical cover, there is no liquid to exit. The present invention differs from the teachings of Woodcock as contemplating a portable bait bucket designed to hold bait in water for easy dispensing and whereby when the bait bucket is tipped, the bait leaves the bucket while the water is retained therein.

U.S. Pat. No. 3,048,937 to Hustad discloses a live bait dispenser having an internal conveying mechanism carrying a plurality of wire mesh baskets that may be rotated within the container to capture live bait and deposit it on a delivery mechanism. The present invention differs from the teachings of Hustad as being devoid of internal moving parts and as facilitating easy removal of bait from the internal chamber thereof merely by tipping the container.

U.S. Pat. No. 4,000,577 to Kelley discloses a fish bait box having a top opening and a centrally located mesh screen wherein the top opening may be opened and the container may be tipped to cause water to flow from one side of the container and trap the bait against the screen. The present invention differs from the teachings of Kelley as contemplating a portable bait bucket wherein the bait can, essentially, be poured from a controlled opening without the need to reach into the bucket.

U.S. Pat. No. 5,138,975 to Walsh discloses a storage or transport system for small marine creatures and including a means to supply oxygen through the lid to provide oxygen rich water. In order to remove the marine creatures from the center section of the container, the user must reach into an opening provided or insert a small net therein. The present invention differs from the teachings of Walsh as contemplating a portable bait bucket wherein marine creatures used as bait may easily be poured from the container without any water being poured therewith.

U.S. Pat. No. 5,228,231 to Larson discloses a container for holding and dispensing fish bait or the like including a pivotable member contained within the chamber thereof that may be pivoted to a position allowing the user to reach into the pivoted member to retrieve bait. The present invention differs from the teachings of Larson as contemplating a device having no internal movable parts and enabling the user to, essentially, pour live bait from a controlled opening in the bucket.

SUMMARY OF THE INVENTION

The present invention relates to a portable bait bucket. The present invention includes the following interrelated objects, aspects and features:

(1) In a first aspect, the inventive bait bucket is small in size and preferably includes a built-in handle allowing it to be easily carried from place to place.

(2) The inventive bucket includes an internal chamber accessible by an opening in the top thereof closed by a pivotable door having a plurality of openings therethrough allowing air to enter the chamber to maintain some level of oxygenation for the water contained therein.

(3) On a forward face of the bucket, an opening is provided that may be closed with a plug. The opening is provided to allow the user to extract bait from the inner chamber of the bucket.

(4) The inner chamber is divided into two sub-chambers by a divider that includes a water pervious wall allowing water to flow from one sub-chamber to the other. One sub-chamber is connected to the top opening and the forward facing opening. This first sub-chamber contains the bait. The second sub-chamber is not connected with the forward facing opening or the top opening.

(5) In operation, water is poured into the chamber and suitable live bait is inserted into the first sub-chamber through the top opening, whereupon the top opening is closed by pivoting the door thereover. The forward facing opening is closed by the removable plug. With the inventive bucket in a horizontal configuration, water is contained in both sub-chambers and the live bait may freely swim about within the water in the first sub-chamber. When it is desired to remove bait from the inventive bait bucket, the plug is removed from the forward facing opening and the bait bucket is tipped forward at an angle so that water is removed from the first sub-chamber and enters the second sub-chamber via the water pervious wall of the divider. When this occurs, the live bait flows over the top of the divider which extends to just below the forward facing opening, whereupon bait begins to exit the forward facing opening into the waiting hand of the user. As this process is continuing, water fills the second sub-chamber from the first sub-chamber via the water pervious wall of the divider. However, the divider has a generally horizontal water impervious wall adjacent the forward facing opening. As such, water is trapped within the second sub-chamber and does not exit the forward facing opening.

(6) In the preferred embodiment of the present invention, the inventive bait bucket, the pivotable door, the plug and divider are made of any suitable injection molded plastic. If desired, of course, various components of the present invention such as, for example, the pivotable door and the divider, may be made of other materials such as, for example, wood, metal and the like.

Accordingly, it is a first object of the present invention to provide a portable bait bucket.

It is a further object of the present invention to provide such a bait bucket including an internal chamber divided into two sub-chambers, one of which holds live bait.

It is a still further object of the present invention to provide such a bait bucket wherein the sub-chamber holding live bait also includes an access opening and an exit opening.

It is a still further object of the present invention to provide such a device wherein live bait may be poured from the bucket while water is retained therein.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
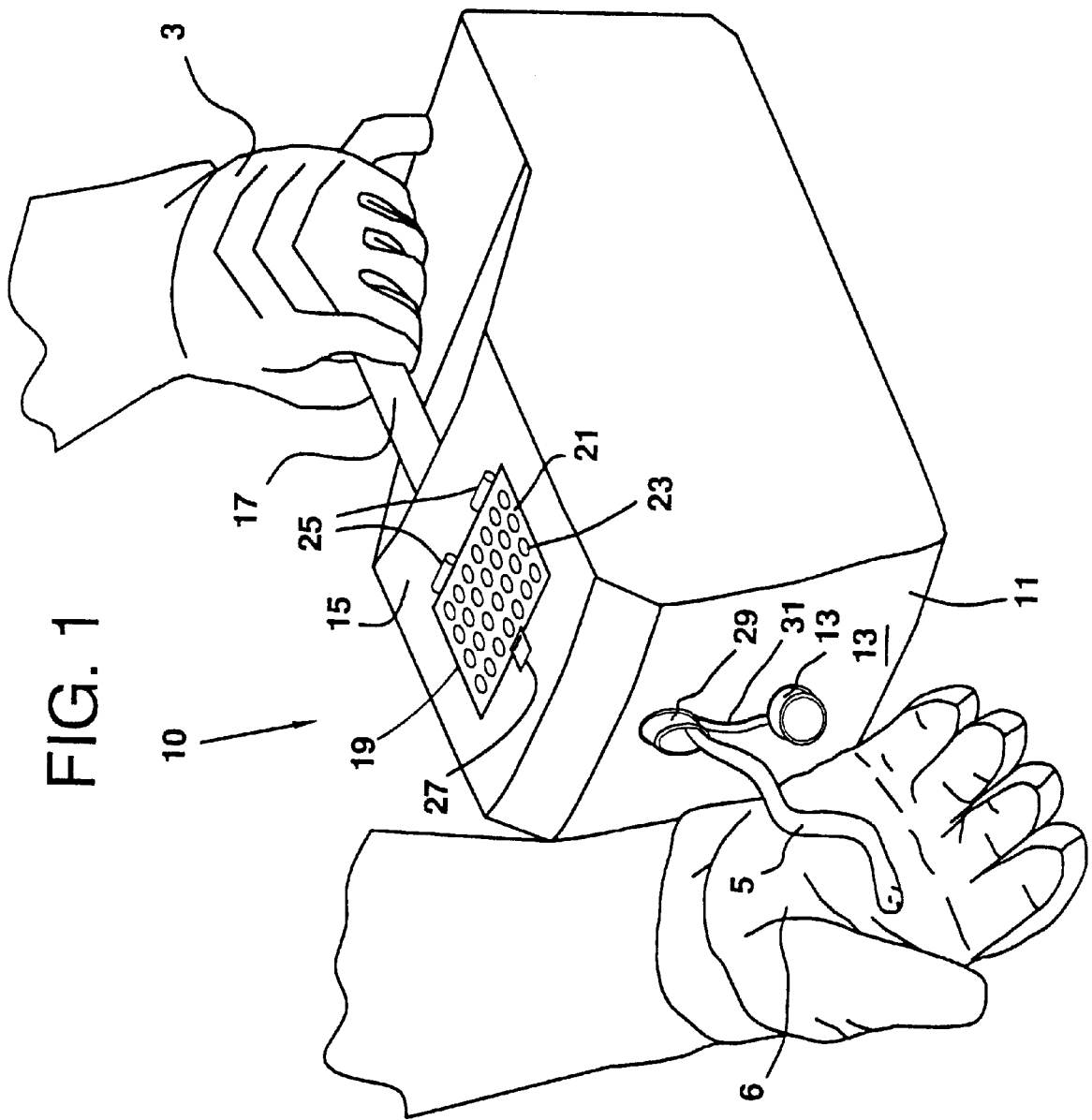
FIG. 1 shows a front side perspective view of the inventive bait bucket showing a preferred mode of use.

With reference, first, to FIG. 1, the inventive bait bucket is generally designated by the reference numeral 10 and is seen to include a body 11 having a forward face 13, a top wall 15, and an integrally molded handle 17 sized to be gripped by the hand 3 of the user.

The wall 15 has an opening 19 closed by a pivotable door 21 having a multiplicity of openings 23 therethrough designed to allow air access into the internal chamber of the body 11. The door 21 is pivoted on suitable hinges 25 and includes a gripping tab 27 that may be gripped by one of the user's hands to pivot the door 21 between the closed position shown and an open position allowing access to the internal chamber of the body 11.

The forward face 13 includes a forward facing opening 29 closeable by a cap 33 attached at an edge of the opening 29 by an elongated strap 31.

Figure 2:
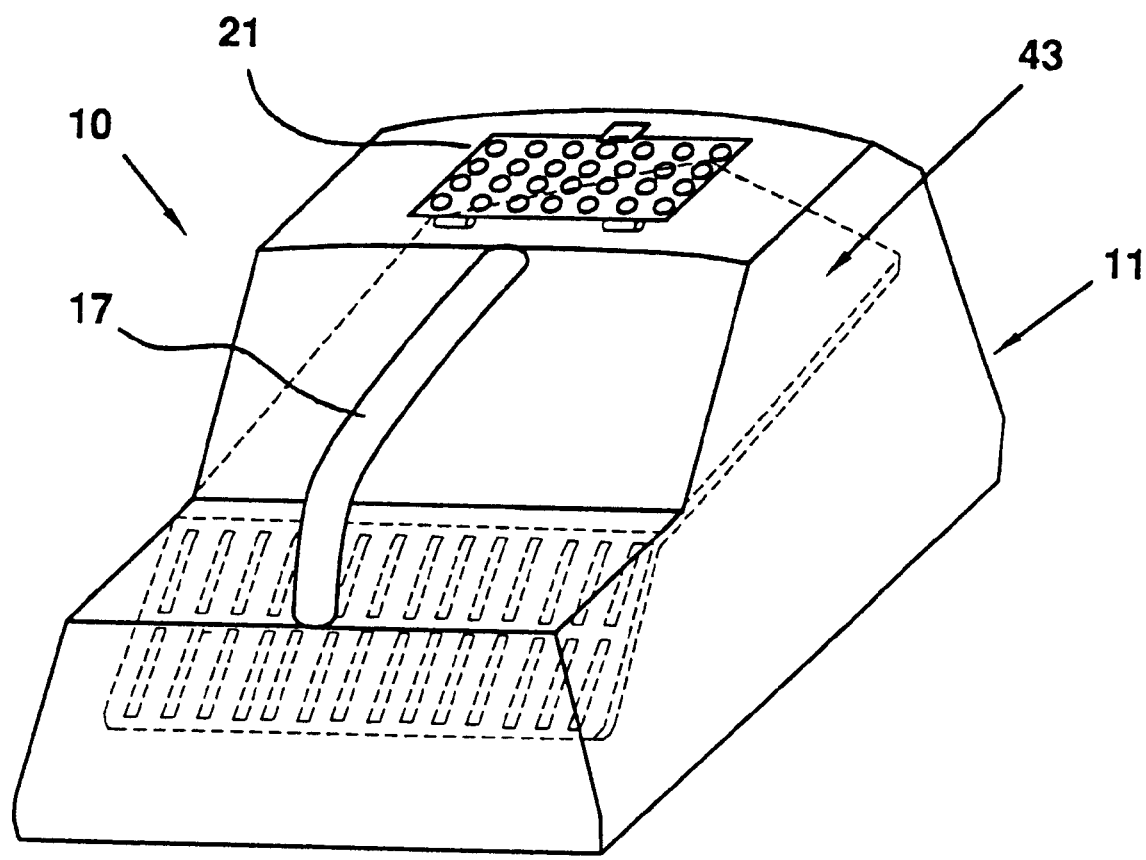
FIG. 2 shows a rear side perspective view of the inventive bait bucket with portions broken away to show internal details.
Figure 3:
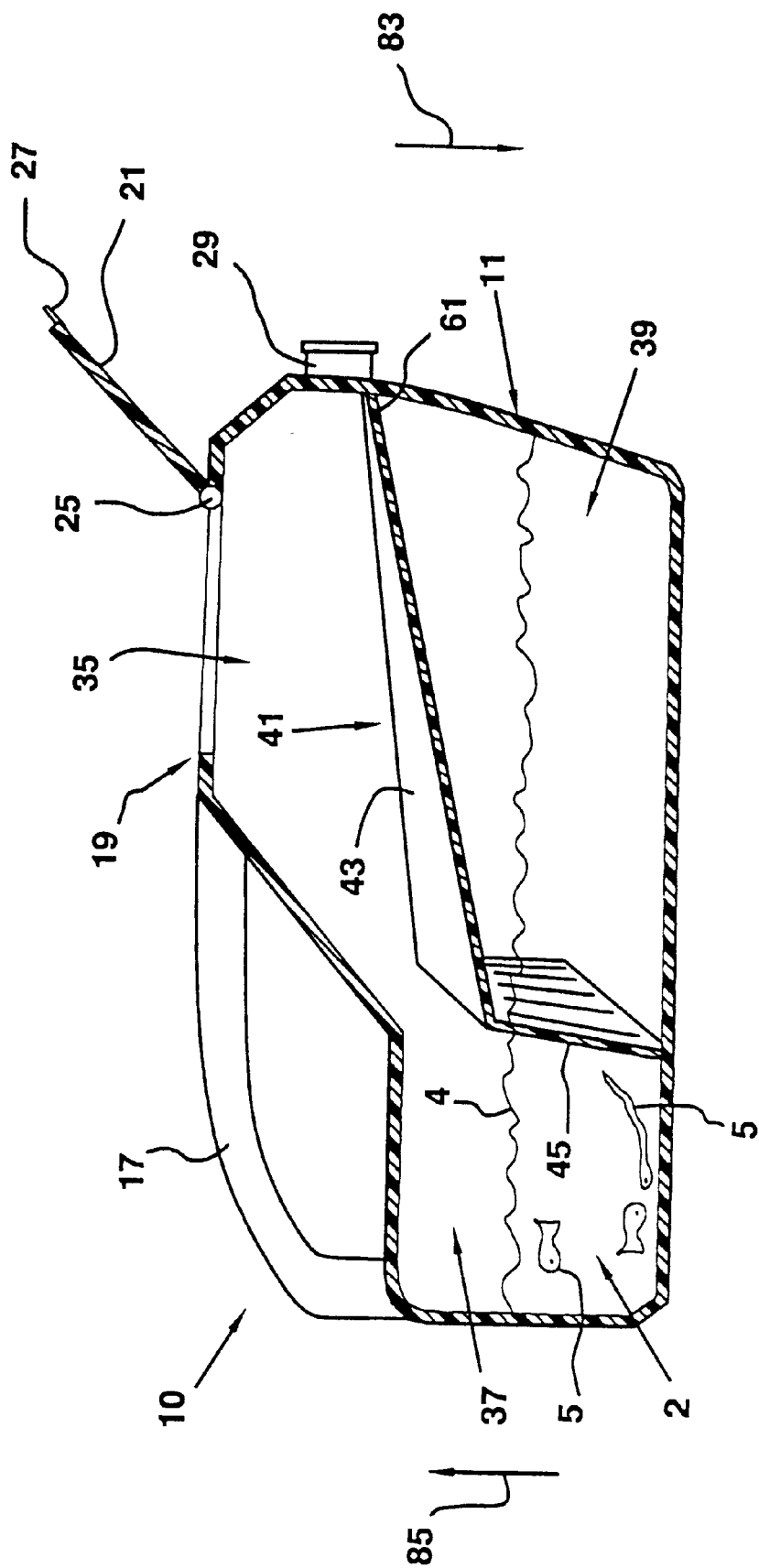
FIG. 3 shows a side view of the inventive bait bucket partially in cross-section.

With particular reference to FIGS. 2 and 3, the body 11 includes an internal chamber 35 divided into a first sub-chamber 37 and a second sub-chamber 39. The chamber 35 is divided into these sub-chambers 37, 39 by a divider 41 having a top generally horizontally extending wall 43 and a generally vertically extending wall 45. The horizontal wall 43 is water impervious while the wall 45 (FIG. 4) is provided with a series of vertical slots 47 that allow water flow between the sub-chambers 37 and 39.

Figure 4:
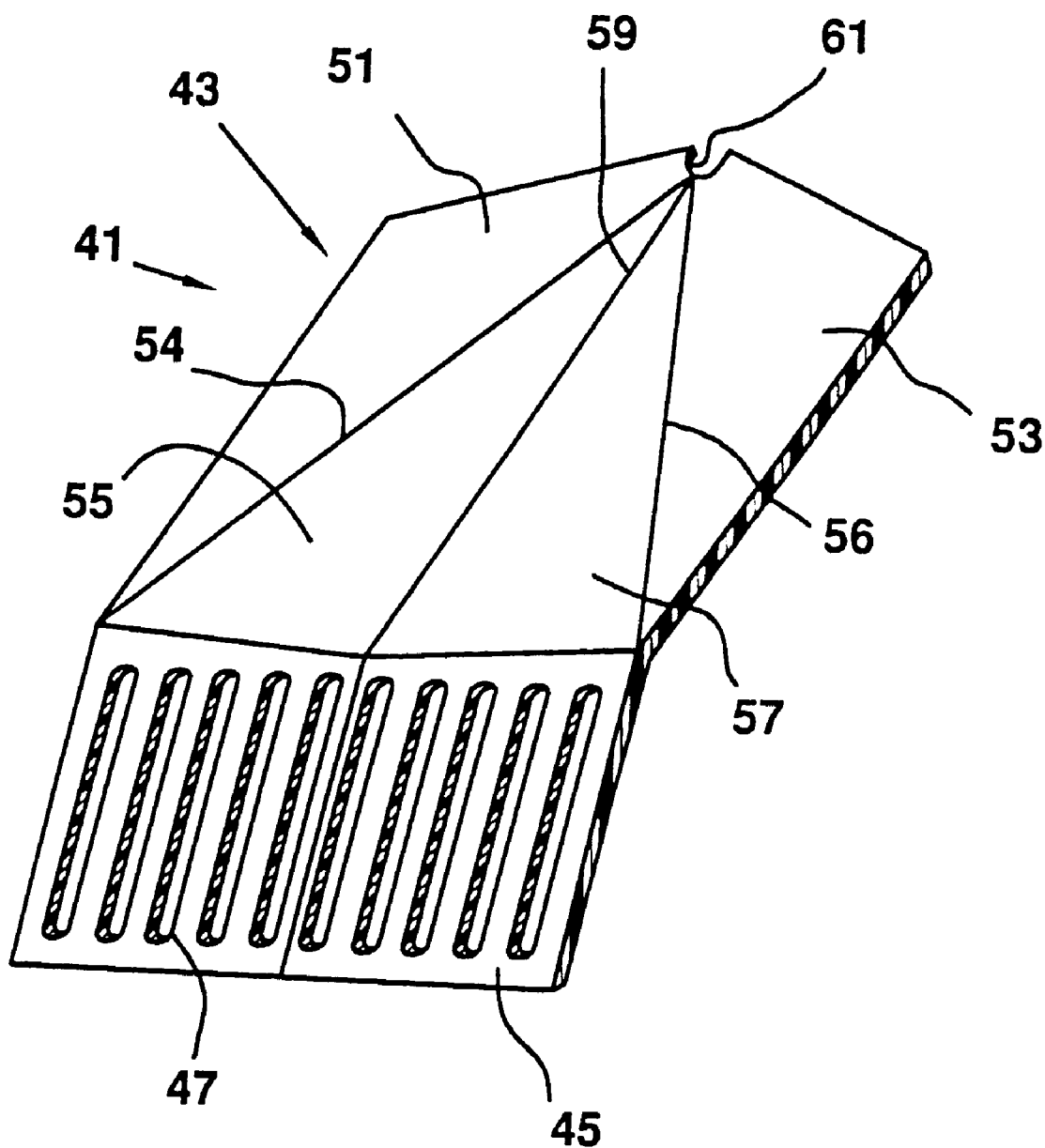
FIG. 4 shows a front perspective view of the internal divider of the present invention.

With further reference to FIG. 4, it is seen that the generally horizontal wall 43 includes outer surfaces 51 and 53 and inner surfaces 55 and 57. The outer surfaces 51 and 53 are generally horizontal and the inner surfaces 55 and 57 have a line 59 of intersection that leads to a generally semicircular depression 61 that is positioned immediately below the forward facing opening 29 as best seen in FIG. 3. The surfaces 55 and 57 are angled toward one another with their respective outer edges 54 and 56 being higher in elevation than the line 59. This structure provides a "funnel" funneling bait from the edges of the surfaces 55 and 57 that are adjacent the wall 45 in a direction of convergence as the bait flows toward the semicircular depression 61 along the dividing line 59. This convergence is also seen in FIG. 3.

Figure 5:
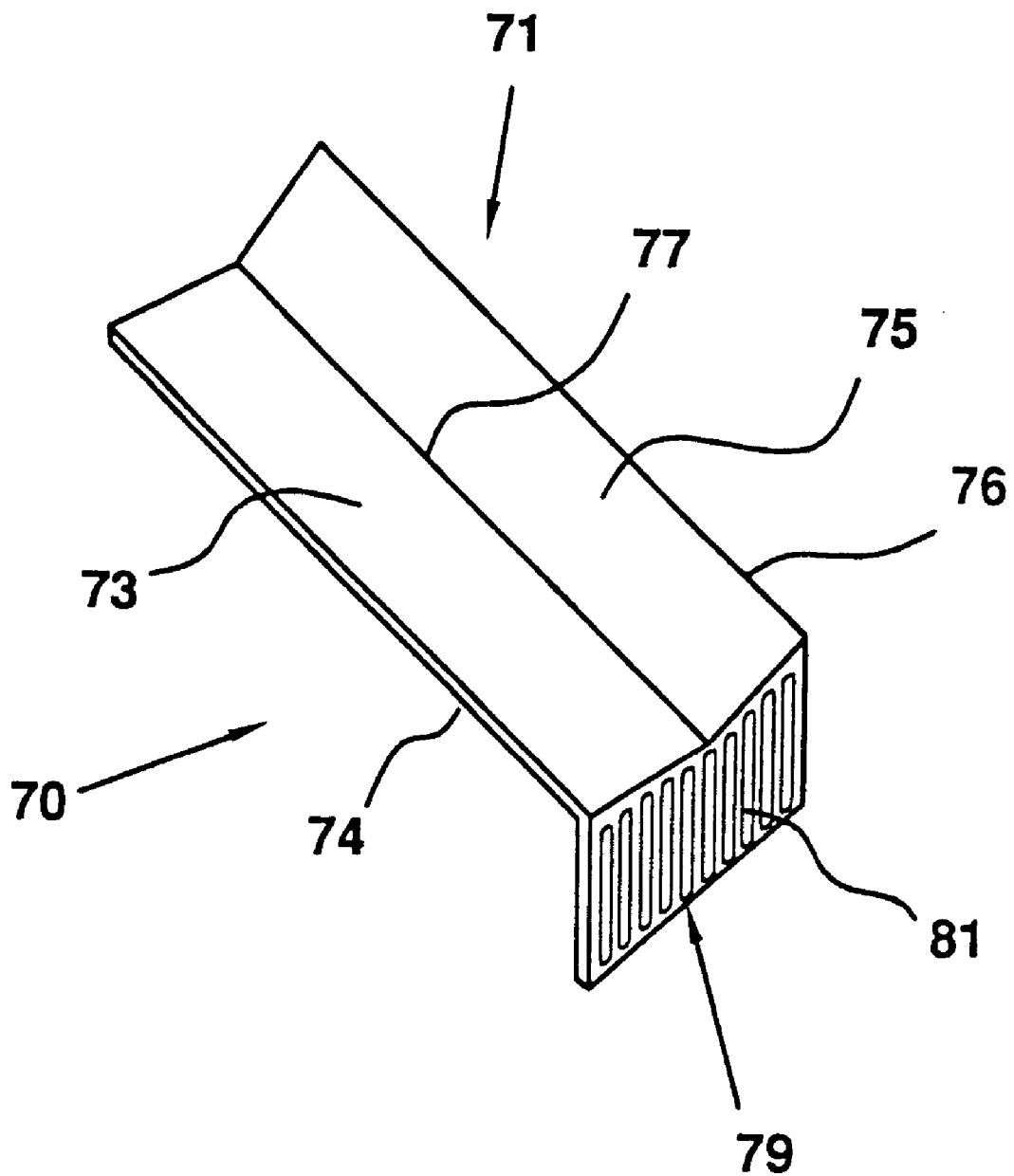
FIG. 5 shows a perspective view of an alternative construction of the internal divider of the present invention.

With reference to FIG. 5, an alternative construction for the divider is designated by the reference numeral 70 and is seen to include a generally horizontal wall 71 made up of two surfaces 73 and 75 that are slightly angled in a direction of downward convergence from upper extreme side edges 74 and 76, respectively, to a line of intersection 77. The surfaces 73 and 75 operate in generally the same manner as the surfaces 55 and 57 best seen in FIG. 4. However, they do not converge the live bait in the direction of the opening 29 as well as does the divider 41. The divider 71 also includes a generally vertical wall 79 having a plurality of slots 81 analogous to the slots 47 of the wall 45 of the divider 41.

In the operation of the present invention, with reference to the figures, water 2 (FIG. 3) is filled to the level 4 shown.

Bait 5 may freely swim within the sub-chamber 37 but is prevented from entering the sub-chamber 39 by the dimensions of the slots 47. The door 21 is closed over the opening 19 in the manner shown in FIG. 1 and the cap 33 is placed in the opening 29 to seal the interior of the chamber, although the holes 23 in the door 21 allow air to enter the chamber 35.

When it is desired to remove bait 5 from the container, in the view of FIG. 3, the container 10 is pivoted in the direction of the arrows 83, 85, thereby tipping the container 10 such that water 2 begins to fill the sub-chamber 39 while it drains from the sub-chamber 37 through the slots 47 of the divider 41. At the same time, the bait 5 begins to engage the wall 45 and as the container 10 is tipped further, flows over the top of the wall 43 while being channeled by the converging walls 55, 57 toward the opening 29. The cap 33 may be removed from the opening 29 and the bait may flow from the opening 29 and into the hand 6 of the user as seen in FIG. 1. The same scenario is true where the divider 71 is employed with the bait 5 flowing over the intersecting line 77 and being led toward the opening 29.

The wall 43 of the divider 41 is fluid impervious. As such, as water flows into the sub-chamber 39, it cannot escape past the wall 43 and out the opening 29. Thus, the bait 5 flows through the opening 29 free of water and in a manner easy to control by the user.

In the preferred embodiment of the present invention, the body 11, the divider 41 (or 71), door 21, cap 33 and strap 31 are made of suitable molded plastic. Of course, if desired, some or all of these components may be made of other materials as desired such as, for example, wood, metal, or any other desirable material.

As such, an invention has been disclosed in terms of a preferred embodiment thereof which fulfills each and every one of the objects of the invention as set forth hereinabove and provides a new and useful portable bait bucket of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A portable bait bucket, comprising:
   a) a body having an upper wall, a front face wall and an internal chamber;
   b) an access opening through said body allowing insertion of water and live bait into said chamber;
   c) said chamber including a first sub-chamber and a second sub-chamber separated by a divider having a generally horizontal fluid impervious first wall portion engaging an inner surface of said front face wall and a generally vertical fluid pervious second wall portion;
   d) an exit opening through said front face wall just above a location where said first wall portion engages said inner surface of said front face wall;
   e) said access opening accessing said first sub-chamber;
   f) whereby, water and live bait are inserted through said access opening into said first sub-chamber, and tilting of said body causes water to flow through said second wall portion into said second sub-chamber while live bait moves over said first wall portion and through said exit opening.

2. The bait bucket of claim 1, further including a door pivotably mounted to move between a first position closing said access opening and a second position opening said access opening.

3. The bait bucket of claim 1, wherein said access opening is generally rectangular.

4. The bait bucket of claim 1, wherein said first wall portion of said divider includes two flat surfaces angled toward one another.

5. The bait bucket of claim 4, wherein said flat surfaces have outer walls that converge toward one another in a direction toward said exit opening.

6. The bait bucket of claim 4, wherein said first wall portion further includes two additional flat surfaces, one to each side of a respective one of said first-mentioned flat surfaces.

7. The bait bucket of claim 5, wherein said first wall portion further includes two additional flat surfaces, one to each side of a respective one of said first-mentioned flat surfaces.

8. The bait bucket of claim 1, wherein said second wall portion has a plurality of communication openings therethrough.

9. The bait bucket of claim 8, wherein said communication openings comprise vertical slots.

10. The bait bucket of claim 1, further including a plug insertable into said exit opening to seal said exit opening.

11. The bait bucket of claim 10, further including a strap interconnected between a periphery of said exit opening and said plug.

12. The bait bucket of claim 1, further including a handle formed on said body.

13. The bait bucket of claim 1, wherein said handle is integral with said body.

14. The bait bucket of claim 1, wherein said body is made of plastic.

15. A portable bait bucket, comprising:
   a) a molded plastic body having an integrally formed handle, an upper wall, a front face wall and an internal chamber;
   b) a rectangular access opening through said body allowing insertion of water and live bait into said chamber and a door pivotably mounted to move between a first position closing said access opening and a second position opening said access opening;
   c) said chamber including a first sub-chamber and a second sub-chamber separated by a divider having a generally horizontal fluid impervious first wall portion engaging an inner surface of said front face wall and a generally vertical fluid pervious second wall portion having a plurality of vertical slots therethrough;
   d) an exit opening through said front face wall just above a location where said first wall portion engages said inner surface of said front face wall and a plug removably insertable in said exit opening;
   e) said access opening accessing said first sub-chamber;
   f) whereby, water and live bait are inserted through said access opening into said first sub-chamber, and tilting of said body causes water to flow through said second wall portion into said second sub-chamber while live bait moves over said first wall portion and through said exit opening.

16. The bait bucket of claim 15, wherein said first wall portion of said divider includes two flat surfaces angled toward one another.

17. The bait bucket of claim 16, wherein said flat surfaces have outer walls that converge toward one another in a direction toward said exit opening.

18. The bait bucket of claim 16, wherein said first wall portion further includes two additional flat surfaces, one to each side of a respective one of said first-mentioned flat surfaces.

19. The bait bucket of claim 15, further including a strap interconnected between a periphery of said exit opening and said plug.

* * * * *